United States Patent Office 3,453,072
Patented July 1, 1969

3,453,072
METHOD OF PRODUCING OXIDE AND HYDROXIDE OF ZINC
Angel Vian-Ortuño, Segundo Jimenez-Gomez, and Antonio Diez-Vilches, Madrid, Spain, assignors to Empresa Auxiliar de la Industria, S.A., Madrid, Spain
No Drawing. Filed May 8, 1967, Ser. No. 636,651
Claims priority, application Spain, May 10, 1966, 326,551
Int. Cl. C01g 9/02
U.S. Cl. 23—147                                    15 Claims

ABSTRACT OF THE DISCLOSURE

Zinc oxide and zinc hydroxide of high purity are obtained from an acidic zinc ions-containing aqueous liquor by reacting the liquor with ammonia so that of the zinc ions and the ammonia a soluble ammoniacal zinc complex will be formed, heating the thus-formed solution so as to decompose the ammoniacal zinc complex and to form a suspension of zinc oxide and zinc hydroxide in an ammoniacalic solution while simultaneously freeing a portion of the initially introduced ammonia in gaseous form, which freed ammonia may be used for the treatment of subsequent portions of the initial liquor. The suspended zinc oxide and zinc hydroxide may now be separated from the solution or may be maintained in the same. In any event, the residual ammoniacal solution with or without zinc oxide and hydroxide suspended therein is now treated with a milk of lime so as to free the residual ammonia from the solution and forming an aqueous salt solution. The thus freed ammonia may also be recycled for introduction into subsequent portions of the starting liquor and, unless the zinc oxide and zinc hydroxide had been previously separated from the liquor, the same are now separated therefrom in substantially pure form.

Background of the invention

Zinc-containing leaching liquors or zinc-containing solutions are frequently used as the starting material for obtaining zinc hydroxide and zinc oxide, the zinc hydroxide being an intermediate product in the production of zinc oxide.

Theoretically, it would suffice to add milk of lime or other alkaline materials, particularly hydroxides to the leaching liquor or solution containing zinc ions in order to raise the pH sufficiently to precipitate zinc hydroxide. Milk of lime or the like should be introduced in the stoichiometrically required amount to form a salt with the anion of the, generally acidic, leaching liquor or solution.

However, by proceeding in this manner, it is not possible to obtain zinc oxide of the desired purity by simple calcination of the precipitated zinc hydroxide, because the precipitating and precipitated zinc hydroxide has strong adsorptive characteristics so that the precipitated zinc hydroxide will retain a relatively large proportion of calcium oxide, if milk of lime has been used for precipitating the zinc hydroxide. The proportion of calcium oxide in the zinc hydroxide may be higher than 2%, even if precipitation is carried out at the relatively high temperature of 100° C.

On the other hand, the low solubility of the calcium oxide and thus the slow reaction thereof with the anion of the acidic leaching liquor or the like will prolong the reaction time so that the reaction has to be carried out for a period of at least about 90 minutes if the yield of precipitated zinc hydroxide should approach 100% relative to the zinc initially dissolved in the leaching liquor or solution.

A higher degree of purity of the precipitated zinc hydroxide would be obtained if the neutralization of the leaching liquor would be carried out with a saturated solution of calcium hydroxide rather than with milk of lime which contains undissolved calcium oxide. However, this generally is not a practical solution of the problem because for precipitating one kilogram of zinc in the form of zinc hydroxide 1.3 cubic meters of saturated calcium hydroxide solution would be required. The manipulation of such large quantities of calcium hydroxide solution, including the heating thereof to the preferred precipitation temperature of about 100° C., would considerably increase the costs of the process and enlarge the size of the required installation.

For these reasons, pure zinc oxide is usually obtained by oxidizing zinc metal vapors, however, the last-mentioned process requires electrolytically obtaining zinc from a solution thereof in sulfuric acid, which sulfuric acid solution in turn is obtained by dissolving impure zinc hydroxide formed by precipitation with lime, as described further above, in sulfuric acid.

The present invention proposes to overcome the difficulties with respect to obtaining pure zinc hydroxide and zinc oxide by the milk of lime or the like precipitation process and to obtain in a manner which lends itself to continuous operation a precipitate of zinc hydroxide and zinc oxide, i.e. a very pure and partially dehydrated zinc hydroxide, directly from the leaching liquor or the like. According to the method of the present invention practically 100% recovery of the dissolved zinc in the form of zinc oxide and zinc hydroxide is possible in a simple process which may be carried out in a continuous manner and which also will permit recovery of substantially all of the heat required for carrying out the process.

Summary of the invention

According to the method of the present invention, zinc oxide and zinc hydroxide of high purity, i.e. a mixture of zinc hydroxide and zinc oxide, are recovered from a zinc ions-containing aqueous liquor by reacting the zinc ions-containing liquor with ammonia so as to form of the ammonia and the zinc ions an ammoniacalic zinc complex dissolved in the liquor. The thus-formed solution of the ammoniacal zinc complex, the pH of which has been raised by the introduction of ammonia, is then heated at a temperature sufficiently high to decompose the ammoniacal zinc complex and thereby to form a suspension of zinc oxide and zinc hydroxide in the residual ammoniacalic solution whereby simultaneously a part of the initially introduced ammonia is freed and escapes or is withdrawn as gaseous ammonia. The thus-formed ammoniacal suspension of zinc oxide and zinc hydroxide is then treated with an alkaline liquid such as milk of lime, which has a pH sufficiently high to free the residual ammonia of the solution in gaseous form. The thus-formed gaseous ammonia is again withdrawn. Thereby, the solution is transformed into an aqueous salt solution, if milk of lime has been used, into an aqueous calcium salt solution, in which precipitated zinc oxide and zinc hydroxide are suspended. The suspended zinc oxide and zinc hydroxide may then be separated from the solution in conventional manner, washed if desired, and thus recovered.

The ammonia which is freed during the heating of the ammoniacal solution and during the treating of the ammoniacal suspension with an alkaline fluid, is recycled for introduction in gaseous form into the initial zinc ions-containing aqueous liquor for formation therein of the ammoniacal zinc complex.

According to another embodiment of the present invention, the precipitated zinc oxide and zinc hydroxide is separated from the residual ammoniacal solution prior to treatment of the ammoniacal solution with alkaline fluid such as milk of lime or the like.

According to both embodiments of the present invention, zinc oxide and zinc hydroxide of high purity are separated in precipitated form from the reaction liquid, may be washed if desired and then further processed in conventional manner. Apart from complete recycling of the ammonia as described above, it is also possible in accordance with the present invention to utilize the heat contained in the liquid after ammonia has been freed therefrom, for instance by means of milk of lime, in heat exchange with milk of lime or the like prior to introduction of the latter into the ammoniacal liquor.

Description of the preferred embodiments

The process may be carried out as follows:

Zinc-containing solution or leaching liquor, is introduced into the upper portion of a vertical reaction column which may be of a coventional packed column or plate column type. In the upper portion of the column, the zinc-containing liquor drops downwardly in countercurrent to upwardly flowing gaseous ammonia. The ammonia is dissolved in the leaching liquor and will precipitate the zinc in the form of zinc hydroxide which, however, will be converted into a soluble ammoniacal zinc complex. The solution, the pH of which has been raised due to the introduction of the gaseous ammonia and which now contains the soluble ammoniacalic zinc complex will drop further into the center portion of the column and will be exposed in this portion of the column to sufficient heat so as to cause precipitation of zinc oxide and zinc hydroxide while simultaneously freeing part of the ammonia content of the solution in the form of gaseous ammonia.

The reaction which takes place upon heating of the ammoniacalic zinc complex-containing solution may be described as follows:

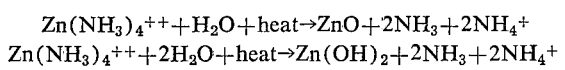

$Zn(NH_3)_4^{++} + H_2O + heat \rightarrow ZnO + 2NH_3 + 2NH_4^+$ $Zn(NH_3)_4^{++} + 2H_2O + heat \rightarrow Zn(OH)_2 + 2NH_3 + 2NH_4^+$ About 80% of the thus-obtained precipitate consists of zinc oxide and only about 20% of zinc hydroxide. The ammonia which is freed during this heating of the reaction mixture arises, in gaseous form, into the upper portion of the column where it is taken up by downwardly flowing, zinc-containing leaching liquor or the like. In this manner a portion of the ammonia is recycled which portion amounts to about 50% of the total amount of ammonia which is used for formation of the ammoniacal zinc complex. The other, approximately half of the ammonia, is retained in the residual leaching liquor in the form of a salt with the anion of the original leaching liquor, which salt, is dissolved and substantially ionized.

The temperature required for decomposing the ammoniacal zinc complex so as to precipitate zinc hydroxide and zinc oxide, generally will vary between about 60° C. and 100° C. Higher temperatures could also be used, however, temperatures above the boiling point of the solution would require pressure equipment and this is not necessary. The time required for decomposition of the ammoniacal zinc complex and precipitation of zinc oxide and zinc hydroxide depends on the decomposition temperature, however, generally, and within the range of between about 60° C. and 100° C., it will be between about 5 and 30 minutes.

Total decomposition of the ammoniacal zinc complex can be obtained at 100° C. within ten minutes, and these conditions, i.e., a decomposition temperature of about 100° C. and a decomposition period of about 10 minutes are generally preferred.

The warm residual leaching liquor which will have a temperature slightly below that to which it has been heated during the decomposition described above, will still contain about one-half of the originally introduced ammonia in the form of a dissolved ammonium salt and will hold in suspension precipitated oxide and hydroxide of zinc. The thus formed suspension flows further down towards the lower portion of the column and is contacted in the lower portion of the column with preheated milk of lime which will serve to liberate the ammonia from the solution in the form of gaseous ammonia. The milk of lime is introduced in just the stoichiometrically required amount for liberating the ammonia, so that upon escape or withdrawal of the gaseous ammonia the liquor will be an aqueous solution of the calcium salt of the anion originally present in the leaching liquor.

By proceeding in this manner, the purity of the previously precipitated zinc oxide and zinc hydroxide is not affected, whereas the purity of the zinc oxide and zinc hydroxide would be affected if—in accordance with prior art methods—the precipitation of the zinc oxide and zinc hydroxide were caused by the introduction of milk of lime. The gaseous ammonia which is thus separated from the liquor will also rise up to the upper portion of the column to be introduced into subsequent portions of initial zinc ions-containing leaching liquor so that the entire ammonia is completely recycled by first being introduced into original leaching liquor and then separated therefrom partly during the heating of the ammoniacal zinc complex-containing solution and partly during the treating with milk of lime, for reintroduction into subsequent portions of original leaching liquor.

This continuous cycle takes place inside the column and thereby losses of ammonia are practically eliminated.

The period of time required for separating ammonia from the liquor by introduction of milk of lime will depend on the temperature at which this step of treatment is carried out and on the composition of the milk of lime, and may vary between about 5 and 90 minutes. The temperature also may vary between about 60° C. and about 100° C., again it would be possible to operate at somewhat higher temperatures, however, operating at or above the boiling point would require pressurized equipment and this would unnecessarily increase the costs of the equipment and of carrying out the process. The composition of the milk of lime may vary between a saturated aqueous solution of calcium oxide and a liquid which contains calcium oxide in excess over the concentration thereof which corresponds to a saturated calcium hydroxide solution. Such excess may be up to four times the amount of calcium hydroxide which can be dissolved at the given temperature so that the total amount of calcium oxide or calcium oxide equivalent in the form of calcium hydroxide, may be up to five times the saturation concentration thereof.

According to a preferred embodiment of the present invention, the treating with milk of lime for driving off residual ammonia is carried out at a temperature of about 100° C. for a period of about 30 minutes with a milk of lime which contains 100% of calcium oxide in excess over the amount thereof which would correspond to saturation concentration. Under these conditions, the entire ammonia and all of the initially present zinc are recovered and the precipitated zinc oxide and zinc hydroxide contain less than 0.01% of calcium and the proportion of zinc oxide in the precipitate is higher than 80%.

Furthermore, according to a preferred embodiment of the present invention, the lower portion of the treating column, such as the lower plates of the plate column, serves also as heat exchanger inasmuch as the suspension of zinc oxide-hydroxide in residual calcium leaching liquor is cooled by means of coils or plates in the interior of which the milk of lime is circulating prior to being introduced into the ammoniacalic liquor. In this manner, the major portion of the heat requirements of the process can be met and only relatively little heat energy has to be supplied from outside sources.

The suspension leaving the lower portion of the treating column is then separated, for instance by filtration, into the precipitated oxide-hydroxide of zinc and residual calcium leaching liquor. The separated precipitate preferably is then washed with water.

The process of the present invention need not be carried out by the continuous column method described above but, for instance, may also be carried out in three independent stages, namely:

(1) In a treating column, the ammoniacalic complex is formed and decomposed so that a suspension of oxide hydroxide of zinc in an aqueous ammonium salt solution will leave the column. Temperature and time of this operation will substantially correspond to those described with respect to the single column process.

(2) The suspension leaving the column is separated by filtration or other conventional methods into the precipitate of the zinc oxide and hydroxide which may be washed and conventionally further treated, and the zinc-free ammoniacal leaching liquor plus the wash waters accruing from the washing of the separated precipitate.

(3) The thus-obtained liquor is then passed into a reactor wherein it is treated with warm calcium oxide for the purpose of recovery of gaseous ammonia which is then returned to the initial stage (1).

It is an advantage of the last-described embodiment of the present method that the decomposition of the ammonium salt can be carried out with solid calcium oxide since—due to the fact that the zinc oxide and hydroxide have been previously separated from the liquor—there is no risk of contaminating the zinc compounds. However, as compared wtih the first-mentioned embodiment, the last-mentioned embodiment of the method will give less heat recovery, a certain risk of ammonia losses and, furthermore, according to the last-described embodiment of the method, the decomposition of the ammonium salt generally would have to be carried out in a discontinuous manner and this poses certain difficulties, particularly in large scale production.

However, both of the two embodiments described above clearly constitute great advantages over the conventional method described in the introductory portion of the present specification, particularly when it is required to obtain zinc oxide of high purity such as having a purity of more than 99.9%, in view of the greater simplicity of the process, the extremely low labor requirements and the very small outlay for chemicals since essentially only milk of lime or calcium oxide are consumed. Furthermore, the process of the present invention obviously can be carried out with very simple and inexpensive equipment.

The aqueous liquors of zinc ions will be generally acidic, depending on the pH-value of the solutions on the acidic strength of the anion which is accompanying the zinc. The character of the anion is indifferent and does not influence the process.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of recovering zinc oxide and zinc hydroxide of high purity from an acidic zinc ions-containing aqueous liquor, comprising the steps of reacting said liquor with ammonia so as to form of said ammonia and said zinc ions an ammoniacal zinc complex dissolved in said liquor; heating the thus formed solution at a temperature sufficiently high to decompose said ammoniacal zinc complex and to form a suspension of zinc oxide and zinc hydroxide in an ammoniacal solution, and to simultaneously free part of the initially introduced ammonia in gaseous form; treating the thus formed ammoniacal suspension with milk of lime in the stoichiometrically required amount for freeing the residual ammonia of said solution and at a temperature sufficiently high to free said residual ammonia in gaseous form thereby forming an aqueous solution of a calcium salt having precipitated zinc oxide and zinc hydroxide suspended therein; and recovering said zinc oxide and zinc hydroxide from the thus formed suspension.

2. A method as defined in claim 1, wherein the gaseous ammonia freed by decomposition of said ammoniacal zinc complex and by said treating with milk of lime are recycled for reacting with said acidic, zinc ions-containing aqueous liquor.

3. A method as defined in claim 1, wherein said acidic aqueous liquor includes sulfate ions, and said calcium salt consists at least partly of calcium sulfate.

4. A method as defined in claim 1, wherein said zinc oxide and zinc hydroxide are recovered by separation from the suspension thereof in said aqueous solution of calcium salt, and the thus separated precipitate is washed with water.

5. A method as defined in claim 1 wherein zinc oxide and zinc hydroxide are separated from the suspension in an ammoniacal solution prior to decomposition of said ammoniacal solution.

6. A method as defined in claim 1, wherein the heating of said ammoniacal zinc complex-containing solution is carried out at a temperature of between 60 and 100° C.

7. A method as defined in claim 6, wherein said heating is carried out for a period of between about 5 and 30 minutes.

8. A method as defined in claim 6, wherein said heating is carried out at a temperature in the vicinity of 100° C.

9. A method as defined in claim 8, wherein said heating is carried out for a period of about 10 minutes.

10. A method as defined in claim 1, wherein said step of reacting said acidic zinc ions-containing liquor with ammonia, heating of the thus formed solution, and treating of the ammoniacal suspension with alkaline liquid are carried out in a continuous manner during downward flow of the liquor through a treating column.

11. A method as defined in claim 1, wherein treating of said ammoniacal suspension with milk of lime is carried out at a temperature between about 60° C. and 100° C. for a period of between about 5 and 90 minutes.

12. A method as defined in claim 11, wherein said treating with milk of lime is carried out at a temperature in the vicinity of the boiling point of said milk of lime for a period of about 30 minutes.

13. A method as defined in claim 11, wherein the calcium content of said milk of lime is equal to between about 100% and 400% of the saturation concentration thereof at said treating temperature.

14. A method as defined in claim 10, wherein the ammonia required for carrying out said method is maintained in continuous absorption-desorption circulation within said treating column.

15. A method as defined in claim 10, wherein said milk of lime, prior to contacting said ammoniacal suspension is heated in indirect heat exchange with the suspension of zinc oxide and zinc hydroxide in said aqueous calcium salt solution.

References Cited

FOREIGN PATENTS 15,288 11/1891 Great Britain.
278,411 10/1927 Great Britain.

OSCAR R. VERTIZ, *Primary Examiner.*

HOKE S. MILLER, *Assistant Examiner.*